(12) United States Patent
Kang et al.

(10) Patent No.: US 10,142,638 B2
(45) Date of Patent: Nov. 27, 2018

(54) METHOD FOR ENCODING/DECODING IMAGE AND DEVICE USING SAME

(71) Applicant: ELECTRONICS AND TELECOMMUNICATIONS RESEARCH INSTITUTE, Daejeon (KR)

(72) Inventors: Jung Won Kang, Daejeon (KR); Ha Hyun Lee, Daejeon (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 385 days.

(21) Appl. No.: 15/027,101

(22) PCT Filed: Oct. 7, 2014

(86) PCT No.: PCT/KR2014/009409
§ 371 (c)(1),
(2) Date: Apr. 4, 2016

(87) PCT Pub. No.: WO2015/053525
PCT Pub. Date: Apr. 16, 2015

(65) Prior Publication Data
US 2016/0241866 A1 Aug. 18, 2016

(30) Foreign Application Priority Data

Oct. 11, 2013 (KR) .................. 10-2013-0121357
Oct. 11, 2013 (KR) .................. 10-2013-0121430
(Continued)

(51) Int. Cl.
*H04N 7/12* (2006.01)
*H04N 19/187* (2014.01)
(Continued)

(52) U.S. Cl.
CPC ......... *H04N 19/187* (2014.11); *H04N 19/107* (2014.11); *H04N 19/157* (2014.11); *H04N 19/30* (2014.11); *H04N 19/503* (2014.11)

(58) Field of Classification Search
CPC .. H04N 19/187; H04N 19/157; H04N 19/107; H04N 19/503; H04N 19/30
(Continued)

(56) References Cited

U.S. PATENT DOCUMENTS

2005/0021814 A1  1/2005  Wang
2013/0077687 A1  3/2013  Wang et al.
(Continued)

FOREIGN PATENT DOCUMENTS

CN  102342103 A  2/2012
CN  103098471 A  5/2013
(Continued)

*Primary Examiner* — Allen C Wong
(74) *Attorney, Agent, or Firm* — NSIP Law

(57) ABSTRACT

A method of decoding a bitstream comprising a plurality of layers according to the present invention includes setting parameters for decoding the bitstream from a random access point when random access occurs, and decoding a decoding target picture, wherein the setting of the parameters includes setting an initialization flag indicating whether the decoding target picture, that is an intra random access point (IRAP) picture, is output by correctly decoding all reference layers of a target layer including the decoding target picture when the random access occurs; setting a flag variable (NoRaslOutputFlag) indicating whether the decoding target picture is used as a random access point; and resetting the initialization flag when the decoding target picture is an IRAP picture and the flag variable is 1.

20 Claims, 11 Drawing Sheets

(30) Foreign Application Priority Data

| Mar. 18, 2014 | (KR) | .................. 10-2014-0031880 |
| Oct. 1, 2014 | (KR) | .................. 10-2014-0132543 |
| Oct. 6, 2014 | (KR) | .................. 10-2014-0134240 |

(51) Int. Cl.
  *H04N 19/30*         (2014.01)
  *H04N 19/503*      (2014.01)
  *H04N 19/107*      (2014.01)
  *H04N 19/157*      (2014.01)

(58) Field of Classification Search
  USPC .................................................. 375/240.16
  See application file for complete search history.

(56) References Cited

U.S. PATENT DOCUMENTS

2016/0021379 A1* 1/2016 Minezawa ........... H04N 19/463
                                                                                                375/240.13
2016/0094860 A1* 3/2016 Minezawa ............. H04N 19/16
                                                                                                375/240.12

FOREIGN PATENT DOCUMENTS

| CN | 103155568 A | 6/2013 |
| JP | 2003-319340 A | 11/2003 |
| KR | 10-2008-0114500 A | 12/2008 |
| KR | 10-1345544 B1 | 12/2013 |
| WO | WO 03/063500 A1 | 7/2003 |

\* cited by examiner

METHOD FOR ENCODING/DECODING IMAGE AND DEVICE USING SAME

CROSS-REFERENCE TO RELATED APPLICATIONS

This application is a U.S. National Stage Application of International Application No. PCT/KR2014/009409, filed on Oct. 7, 2014, which claims the benefit under 35 USC 119(a) and 365(b) of Korean Patent Application No. 10-2014-0134240, filed on Oct. 6, 2014, Korean Patent Application No. 10-2014-0132543, filed on Oct. 1, 2014, Korean Patent Application No. 10-2014-0031880, filed on Mar. 18, 2014, Korean Patent Application No. 10-2013-0121357, filed on Oct. 11, 2013, and Korean Patent Application No. 10-2013-0121430, filed on Oct. 11, 2013 in the Korean Intellectual Property Office.

TECHNICAL FIELD

The present invention relates to video encoding and decoding, and more particularly, to a method of encoding/decoding a video supporting random access to a bitstream and an apparatus using the same.

BACKGROUND ART

In recent years, as high definition (HD) broadcast services are spreading domestically and globally, a large number of users are getting used to high-resolution and high-quality videos and accordingly institutions put spurs to the development of next-generation video devices. Also, with growing interest in ultrahigh-definition (UHD) services having a resolution four times higher than HDTV, compression techniques for higher-quality videos are needed.

For video compression, there may be used an inter prediction technique of predicting pixel values included in a current picture from temporally previous and/or subsequent pictures of the current picture, an intra prediction technique of predicting pixel values included in a current picture using pixel information in the current picture, or an entropy encoding technique of assigning a short code to a symbol with a high appearance frequency and assigning a long code to a symbol with a low appearance frequency.

Video compression technology may include a technique of providing a constant network bandwidth in restricted operating environments of hardware without considering variable network environments. However, to compress video data used for network environments involving frequent changes of bandwidths, new compression techniques are required, wherein a scalable video encoding/decoding method may be employed.

DISCLOSURE

Technical Problem

An aspect of the present invention is to provide a method for decoding a bitstream from a random point and an apparatus using the same.

In detail, an aspect of the present invention a method of layer-wise startup decoding a bitstream from a random access point when an access unit (AU) at the random access point includes an intra random access point (IRAP) picture and a non-IRAP picture, or includes only IRAP pictures which have two or more different network abstraction layer (NAL) unit types.

Technical Solution

An aspect of the present invention provides a method of decoding a bitstream including a plurality of layers, the method including setting parameters for decoding the bitstream from a random access point when random access occurs; and decoding a decoding target picture, wherein the setting of the parameters include setting an initialization flag indicating whether the decoding target picture is correctly decoded and output when the random access occurs; setting a flag variable (NoRaslOutputFlag) indicating whether the decoding target picture is used as a random access point; and resetting an initialization flag of a target layer to 1 when the decoding target picture is an intra random access point (IRAP) picture, the flag variable is 1, the initialization flag of the decoding target picture is 0 and initialization flags of all reference layers of the target layer are 1.

The setting of the initialization flag may set the initialization flag for a base layer of an access unit (AU) at which the random access occurs to 1 and set the initialization flag for a higher layer than the base layer to 0.

The setting of the flag variable (NoRaslOutputFlag) may set the flag variable to 1 when the decoding target picture is an instantaneous decoding refresh (IDR) picture, a broken link access (BLA) picture or an intra random access point (IRAP) picture which is a first picture of the target layer of the bitstream.

The setting of the flag variable (NoRaslOutputFlag) may set the flag variable to 1 when the target picture is an IRAP picture, the initialization flag of the target layer including the target picture is 0, and the initialization flags of all reference layers of the target layer including the target picture are 1.

The method may further include calculating a picture order count (POC) of the decoding target picture as an identifier; constructing a reference picture set and marking a reference picture type for inter prediction of the decoding target picture; determining whether to output the decoding target picture based on the initialization flag; and performing motion estimation and motion compensation on the decoding target picture using a reference picture in a reference picture list generated based on the reference picture set.

The determining of whether to output the decoding target picture may determine not to output the decoding target picture when the decoding target picture is an IRAP picture and the initialization flag of the target layer is 0.

The determining of whether to output the decoding target picture may determine to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, and the decoding target picture is a highest picture among decoded pictures with flag information equal to 1, the flag information being signaled via a slice header and representing whether to output a picture.

The determining of whether to output the decoding target picture may determine to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, the initialization flag of the target layer is 1, and the decoding target picture is a highest picture among decoded pictures with flag information equal to 1, the flag information being signaled via a slice header and representing whether to output a picture.

The method may further include decoding pictures included in a first AU corresponding to the random access point; determining whether to individually output the pictures in the first AU; decoding pictures included in a second AU following the first AU; and determining whether to individually output the pictures in the second AU.

The method may further include determining outputting a first AU picture which outputs a picture determined to be output among the pictures in the first AU, wherein the outputting of the first AU picture outputs an output picture of an output layer when the bitstream includes a base layer to a highest layer, all pictures from base layer to an nth layer ($0 \leq n$) are IRAP pictures, and the base layer to the nth layer include the output layer, and outputs a decoded picture in the nth layer when the bitstream includes a base layer to a highest layer, and an (n+1)th layer to the highest layer include the output layer.

The method may further include determining outputting a second AU picture which outputs a picture determined to be output among the pictures in the second AU, wherein the outputting of the second AU picture outputs an output picture of an output layer when the (n+1)th layer to a kth layer ($n+1 \leq k$) included in the second AU include an IRAP picture and the base layer to the kth layer include the output layer, and outputs a decoded picture in the kth layer or the picture determined to be output when a (k+1) layer to the highest layer comprise the output layer.

The calculating of the POC may set the POC of the decoding target picture to 0 when a picture of a base layer in the same AU is an IDR picture, and set a POC_most significant bit (MSB) of the decoding target picture to 0 when the picture of the base layer is a BLA picture or a first CRA picture of the bitstream.

Another aspect of the present invention provides an apparatus for decoding a bitstream including a plurality of layers, the apparatus including: a prediction module to set a parameter for decoding the bitstream from a random access point when random access occurs and to decode a decoding target picture, wherein the prediction module sets an initialization flag indicating whether the decoding target picture is correctly decoded and output when the random access occurs, sets a flag variable (NoRaslOutputFlag) indicating whether the decoding target picture is used as a random access point, and resets an initialization flag of a target layer to 1 when the decoding target picture is an IRAP picture, the flag variable is 1, the initialization flag of the decoding target picture is 0 and initialization flags of all reference layers of the target layer are 1.

Advantageous Effects

According to an embodiment of the present invention, there are provided a method for decoding a bitstream from a random point and an apparatus using the same.

In detail, according to an embodiment of the present invention, there are provided a method of decoding a bitstream from a random access point when an AU at the random access point includes an IRAP picture and a non-IRAP picture, or includes only IRAP pictures which have two or more different NAL unit types, and an apparatus using the same.

MODE FOR INVENTION

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

It will be understood that when an element is referred to as being "connected" or "coupled" to another element, the element can be directly connected or coupled to another element or intervening elements. Also, when it is said that a specific element is "included," it may mean that elements other than the specific element are not excluded and that additional elements may be included in the embodiments of the present invention or the scope of the technical spirit of the present invention.

Although the terms "first," "second," etc. may be used to describe various elements, these elements should not be limited by these terms. These terms are used only to distinguish one element from another element. For example, a first element may be named a second element without departing from the scope of the present invention. Likewise, a second element may be named a first element.

Although components described in the embodiments of the present invention are independently illustrated in order to show different characteristic functions, such a configuration does not indicate that each component is constructed by a separate hardware constituent unit or software constituent unit. That is, each component includes individual components that are arranged for convenience of description, in which at least two components may be combined into a single component or a single component may be divided into a plurality of components to perform functions. It is to be noted that embodiments in which some components are integrated into one combined component and/or a component is divided into multiple separate components are included in the scope of the present invention without departing from the essence of the present invention.

Some constituent elements are not essential to perform the substantial functions in the invention and may be optional constituent elements for merely improving performance. The present invention may be embodied by including only constituent elements essential to implement the spirit of the invention other than constituent elements used for merely improving performance. A structure including only the essential constituent elements other than optional constituents used for merely improving performance also belongs to the scope of the present invention.

Figure 1:
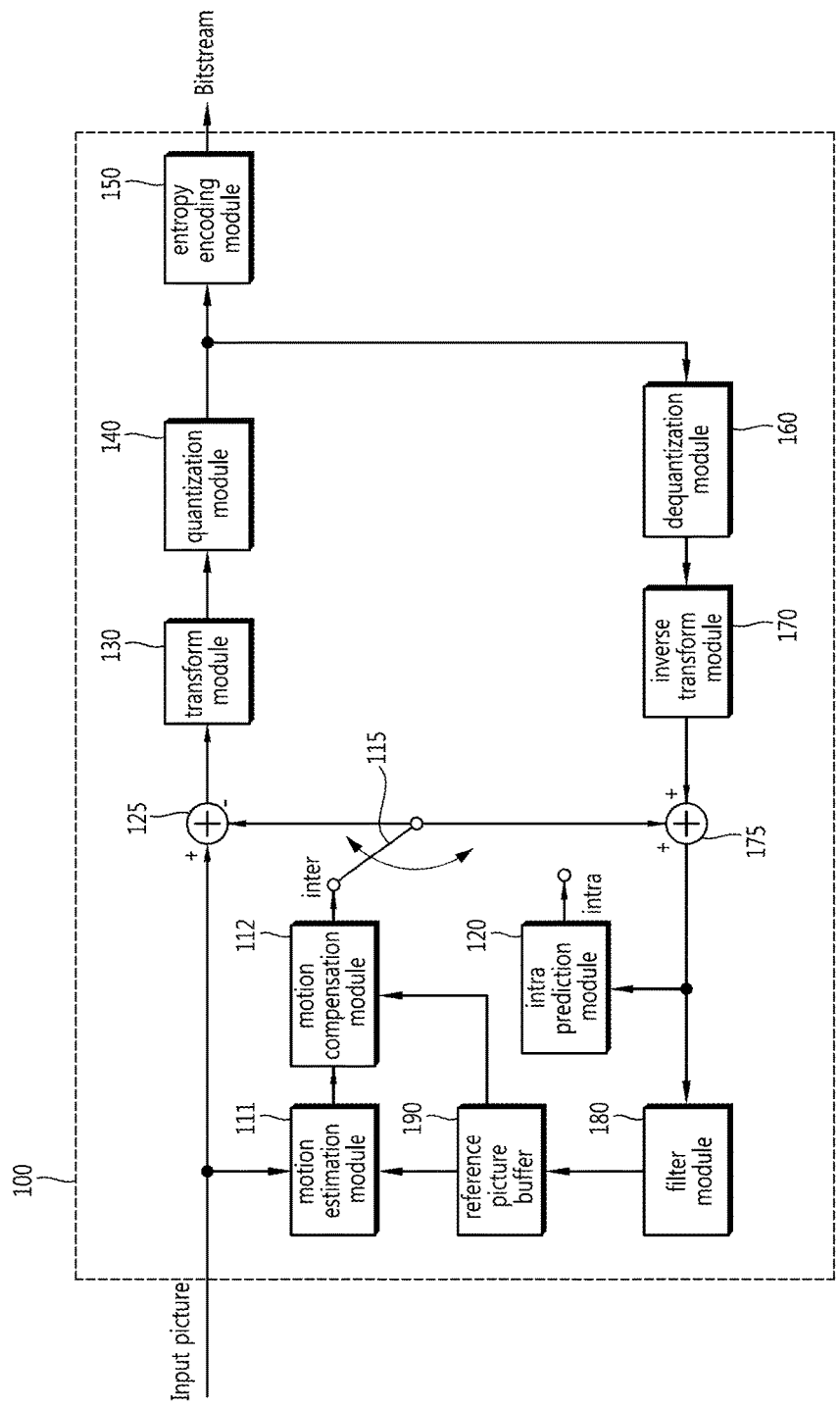
FIG. 1 is a block diagram illustrating a configuration of a video encoding apparatus according to an embodiment.

FIG. 1 is a block diagram illustrating a configuration of a video encoding apparatus according to an embodiment. A scalable video encoding/decoding method or apparatus may be realized by extension of a general video encoding/decoding method or apparatus that does not provide scalability, and the block diagram of FIG. 1 illustrates an example of a video encoding apparatus which may form a basis for a scalable video encoding apparatus.

Referring to FIG. 1, the video encoding apparatus 100 includes a motion estimation module 111, a motion compensation module 112, an intra prediction module 120, a switch 115, a subtractor 125, a transform module 130, a quantization module 140, an entropy encoding module 150, an dequantization module 160, an inverse transform module 170, an adder 175, a filter module 180, and a reference picture buffer 190.

The video encoding apparatus 100 may encode an input picture images in an intra mode or an inter mode and output a bitstream. Intra prediction means an intra-picture prediction, and inter prediction means an inter-picture prediction. In the intra mode, the switch 115 is shifted to 'intra,' and in the inter mode, the switch 115 is shifted to 'inter.' The video encoding apparatus 100 may generate a prediction block for an input block of the input picture and then encode a difference between the input block and the prediction block.

In the intra mode, the intra prediction module 120 may perform spatial prediction by using a pixel value of a pre-encoded block around a current block to generate a prediction block.

In the inter mode, the motion estimation module 111 may obtain a region which is most matched with the input block in the reference picture stored in the reference picture buffer 190 during a motion estimation process to derive a motion vector. The motion compensation module 112 may perform motion compensation using the motion vector and the reference picture stored in the reference picture buffer 190, thereby generating the prediction block.

The subtractor 125 may generate a residual block based on the difference between the input block and the generated prediction block. The transform module 130 may transform the residual block to output a transform coefficient. The quantization module 140 may quantize the transform coefficient according to a quantization parameter to output a quantized coefficient.

The entropy encoding module 150 may entropy-encode a symbol according to probability distribution based on values derived by the quantization module 140 or an encoding parameter value derived in encoding, thereby outputting a bitstream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information to be inferred during an encoding or decoding process and means information necessary for encoding and decoding a picture. The coding parameter may include, for example, values or statistics of an intra/inter prediction mode, a movement/motion vector, a reference picture index, a coding block pattern, presence and absence of a residual signal, a transform coefficient, a quantized transform coefficient, a block size and block partition information. A residual signal may denote a difference between an original signal and a prediction signal, a transformed signal of the difference between the original signal and the prediction signal, or a transformed and quantized signal of the difference between the original signal and the prediction signal. The residual signal may be referred to as a residual block in a block unit.

When entropy encoding is applied, a symbol having a high probability is allocated a small number of bits and a symbol having a low probability is allocated a large number of bits in representation of symbols, thereby reducing a size of bit strings for symbols to be encoded. Accordingly, entropy encoding may enhance compression performance of video encoding.

For entropy encoding, encoding methods, such as exponential Golomb, context-adaptive variable length coding (CAVLC) and context-adaptive binary arithmetic coding (CABAC), may be used. For example, a table used for performing entropy encoding, such as a variable length coding/code (VLC) table, may be stored in the entropy encoding module 150, and the entropy encoding module 150 may perform entropy encoding using the stored VLC table. In addition, the entropy encoding module 150 may derive a binarization method of a target symbol and a probability model of a target symbol/bin and perform entropy encoding using the derived binarization method or probability model.

The quantized coefficient may be dequantized by the dequantization module 160 and inversely transformed by the inverse transform module 170. The dequantized and inversely transformed coefficient is added to the prediction block by the adder 175, thereby generating a reconstructed block.

The reconstructed block is subjected to the filter module 180, and the filter module 180 may apply at least one of a deblocking filter, a sample adaptive offset (SAO), and an adaptive loop filter (ALF) to the reconstructed block or a reconstructed picture. The reconstructed block obtained via the filter module 180 may be stored in the reference picture buffer 190.

Figure 2:
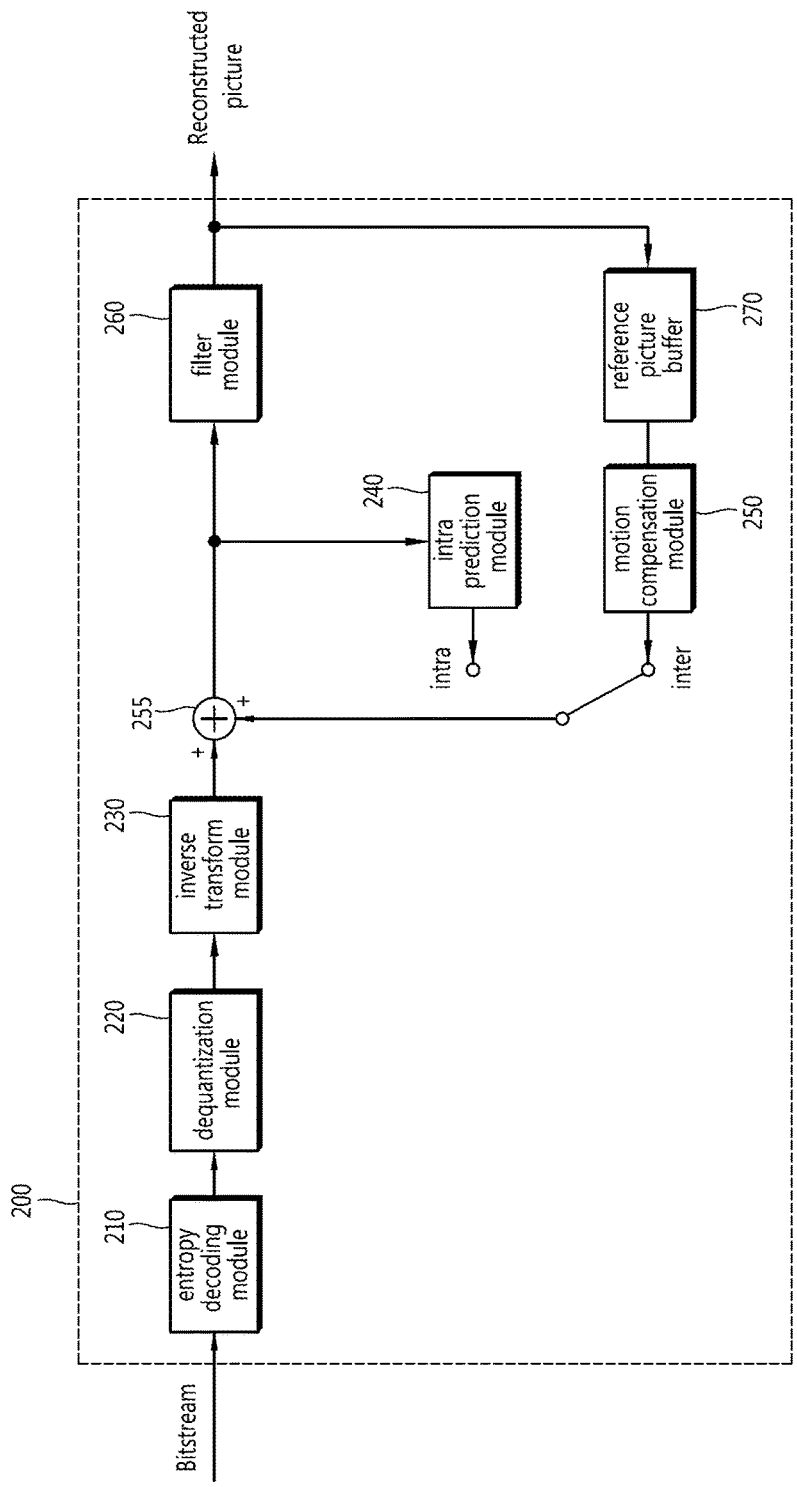
FIG. 2 is a block diagram illustrating a configuration of a video decoding apparatus according to an embodiment.

FIG. 2 is a block diagram illustrating a configuration of a video decoding apparatus according to an embodiment. As described above in FIG. 1, a scalable video encoding/decoding method or apparatus may be realized by extension of a general video encoding/decoding method or apparatus that does not provide scalability, and the block diagram of FIG. 2 illustrates an example of a video decoding apparatus which may form a basis for a scalable video decoding apparatus.

Referring to FIG. 2, the video decoding apparatus 200 includes an entropy decoding module 210, a dequantization module 220, an inverse transform module 230, an intra prediction module 240, a motion compensation module 250, a filter module 260, and a reference picture buffer 270.

The video decoding apparatus 200 receives an input bitstream output from the encoding apparatus and decodes the bitstream in an intra mode or inter mode to output a reconstituted picture, that is, a reconstructed picture. In the intra mode, a switch may be shifted to 'intra,' and in the inter mode, the switch may be shifted to 'inter.' The video decoding apparatus 200 may obtain a residual block reconstructed from the input bitstream, generate a prediction block, and add the residual block and the prediction block to generate a reconstituted block, that is, a reconstructed block.

The entropy decoding module 210 may entropy-decode the input bitstream according to probability distribution to generate symbols including a symbol in a form of a quantized coefficient. Entropy decoding is a method of receiving a binary sequence to generate symbols. The entropy decoding method is similar to the aforementioned entropy encoding method.

The quantized coefficient is dequantized by the dequantization module 220 and inversely transformed by the inverse transform module 230, thereby generating a reconstructed residual block.

In the intra mode, the intra prediction module 240 may perform spatial prediction by using a pixel value of a pre-encoded block around a current block to generate a prediction block. In the inter mode, the motion compensation module 250 may perform motion compensation using a motion vector and a reference picture stored in the reference picture buffer 270, thereby generating a prediction block.

The reconstructed residual block and the prediction block are added by an adder 255, and the added blocks are subjected to the filter module 260. The filter module 260 may apply at least one of a deblocking filter, an SAO, and an ALF to the reconstructed block or the reconstructed picture. The filter module 260 outputs the reconstituted picture, that is, the reconstructed picture. The reconstructed picture may be stored in the reference picture buffer 270 to be used for inter prediction.

Among the entropy decoding module 210, the dequantization module 220, the inverse transform module 230, the intra prediction module 240, the motion compensation module 250, the filter module 260 and the reference picture buffer 270 of the decoding apparatus 200, components directly related to video decoding, for example, the entropy decoding module 210, the dequantization module 220, the inverse transform module 230, the intra prediction module 240, the motion compensation module 250 and the filter module 260 may be defined as a decoder or a decoding unit, separately from the other components.

Further, the decoding apparatus 200 may further include a parsing module (not shown) to parse information about an encoded video included in the bitstream. The parsing module may include the entropy decoding module 210 or be included in the entropy decoding module 210. The parsing module may be provided as one component of the decoding unit.

Figure 3:
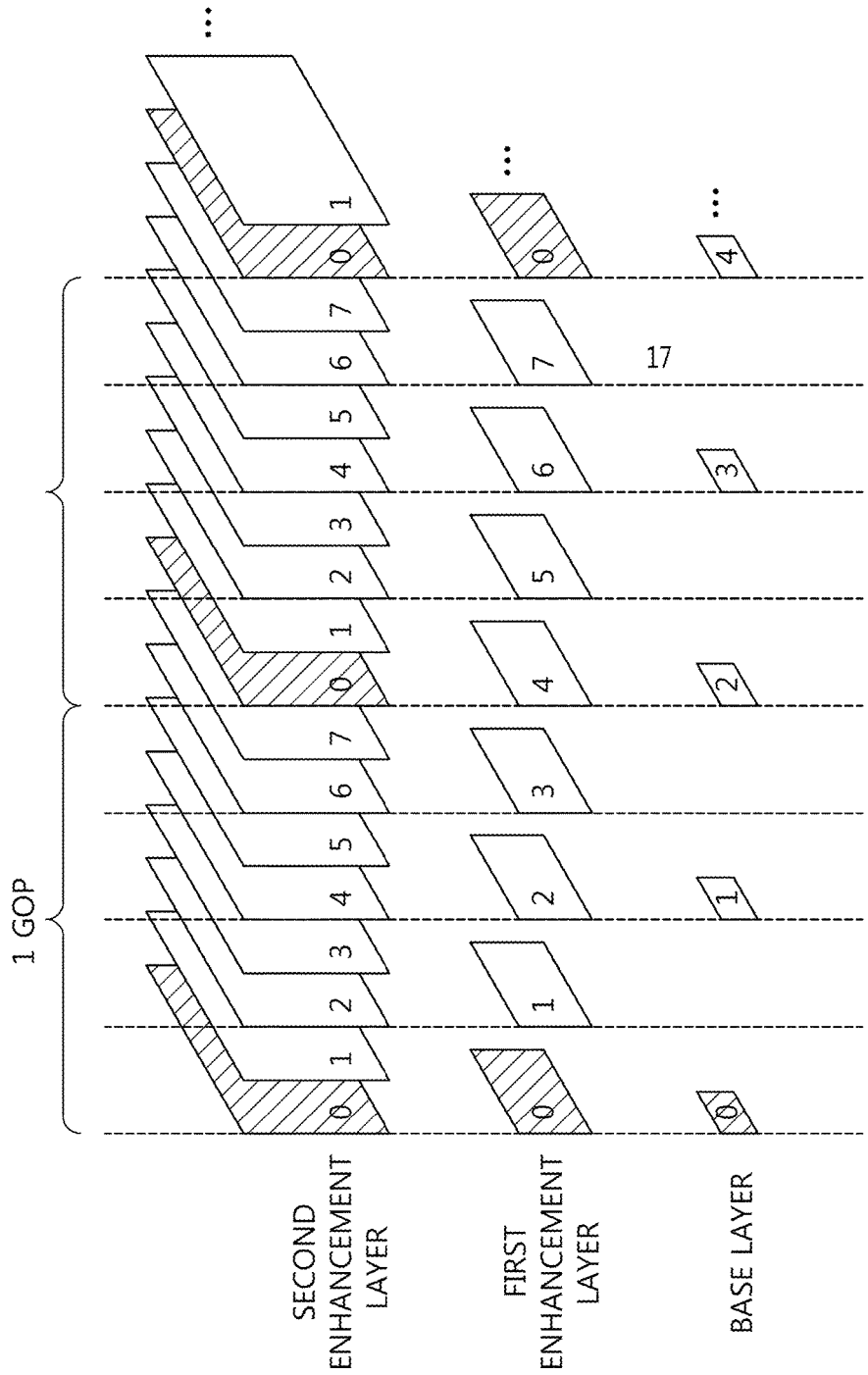
FIG. 3 is a conceptual diagram schematically illustrating a scalable video coding structure using a plurality of layers according to an embodiment of the present invention.

FIG. 3 is a conceptual diagram schematically illustrating a scalable video coding structure using a plurality of layers according to an embodiment of the present invention. In FIG. 3, Group of Picture (GOP) denotes a picture group, that is, a group of pictures.

In order to transmit video data, a transmission medium is needed, and performance thereof is different by each transmission medium according to various network environments. For application to various transmission media or network environments, a scalable video coding method may be provided.

The scalable video coding method is a coding method which utilizes texture information, motion information, residual signals between layers, or the like to remove redundancy between layers, thus improving encoding and decoding performance. The scalable video coding method may provide various scalabilities in spatial, temporal, and quality aspects according to ambient conditions such as transmission bit rate, transmission error rate, and system resources.

Scalable video coding may be performed by using a multi-layer structure so as to provide a bitstream applicable to various network situations. For example, the scalable video coding structure may include a base layer in which video data is compressed and processed using a general video decoding method, and also include an enhancement layer in which video data is compressed and processed using both decoding information of the base layer and a general video decoding method.

Here, a layer refers to a set of pictures and bitstreams that are classified according to a spatial aspect (for example, picture size), a temporal aspect (for example, encoding order, picture output order and frame rate), picture quality, complexity, or the like. Further, the base layer may mean a lower layer, a reference layer or a basic layer, and the enhancement layer may mean a higher layer or an enhancing layer. A plurality of layers may have dependency on each other.

Referring to FIG. 3, for example, the base layer may be defined by standard definition (SD), 15 Hz frame rate and 1 Mbps bit rate, a first enhancement layer may be defined by high definition (HD), 30 Hz frame rate and 3.9 Mbps bit rate, and a second enhancement layer may be defined by 4K-ultra high definition (UHD), 60 Hz frame rate and 27.2 Mbps. These formats, frame rates and bit rates are provided only for illustrative purposes and may be changed and modified as needed. Also, a number of used layers may change depending on circumstances, without being limited to the present embodiment.

For instance, when a transmission bandwidth is 4 Mbps, the first enhancement layer HD may be transmitted at a frame rate reduced to 15 Hz or lower. The scalable video coding method may provide spatial, temporal, and quality scalabilities using the method described above with reference to FIG. 3.

In video encoding and decoding supporting a plurality of layers in a bitstream, that is, scalable coding, since the layers have strong correlations, prediction is performed using such correlations, thereby removing redundant elements of data and enhancing video encoding performance. Hereinafter, prediction of a current layer as a prediction target using information on another layer is referred to as inter-layer prediction. Scalable video coding may refer to scalable video encoding in encoding, and to scalable video decoding in decoding.

The plurality of layers may be different from each other in terms of at least one of resolution, frame rate and color format, and upsampling or downsampling may be performed on a layer to adjust resolution in inter-layer prediction.

Random access in scalable video coding (SVC) will be described considering as follows.

A bitstream may support at least one scalability, for example spatial, quality or temporal scalability, and a video having a structure of at least one or more layers may be encoded/decoded such that random access is possible.

A plurality of layers, for example, one or more layers, may be provided, wherein a lowest layer may be referred to as a base layer. Three layers are illustrated in the following description. However, the present invention is applicable without limiting the number of layers.

A higher layer and a lower layer may be encoded/decoded by a single loop or multiple loop method.

When a random access point of a bitstream is generated in the encoding apparatus, the decoding apparatus may decode the bitstream from the random access point generated by the encoding apparatus.

A base layer included in an access unit (AU) at a random access point may be encoded as an intra random access point (IRAP) picture, and higher layers may be encoded as either non-IRAP pictures or IRAP pictures. An AU refers to a set of Network Abstraction Layer (NAL) units or pictures having the same output time.

Meanwhile, only when all pictures of layers at a random access point are encoded into randomly accessible forms, decoding a bitstream from the point is possible. That is, when a randomly inaccessible picture is included in layers at a random access point, it is impossible to decode a bitstream from the point.

The present invention proposes a method for decoding a bitstream from a random access point even when pictures of layers at the random access point include a randomly inaccessible picture.

Figure 4:
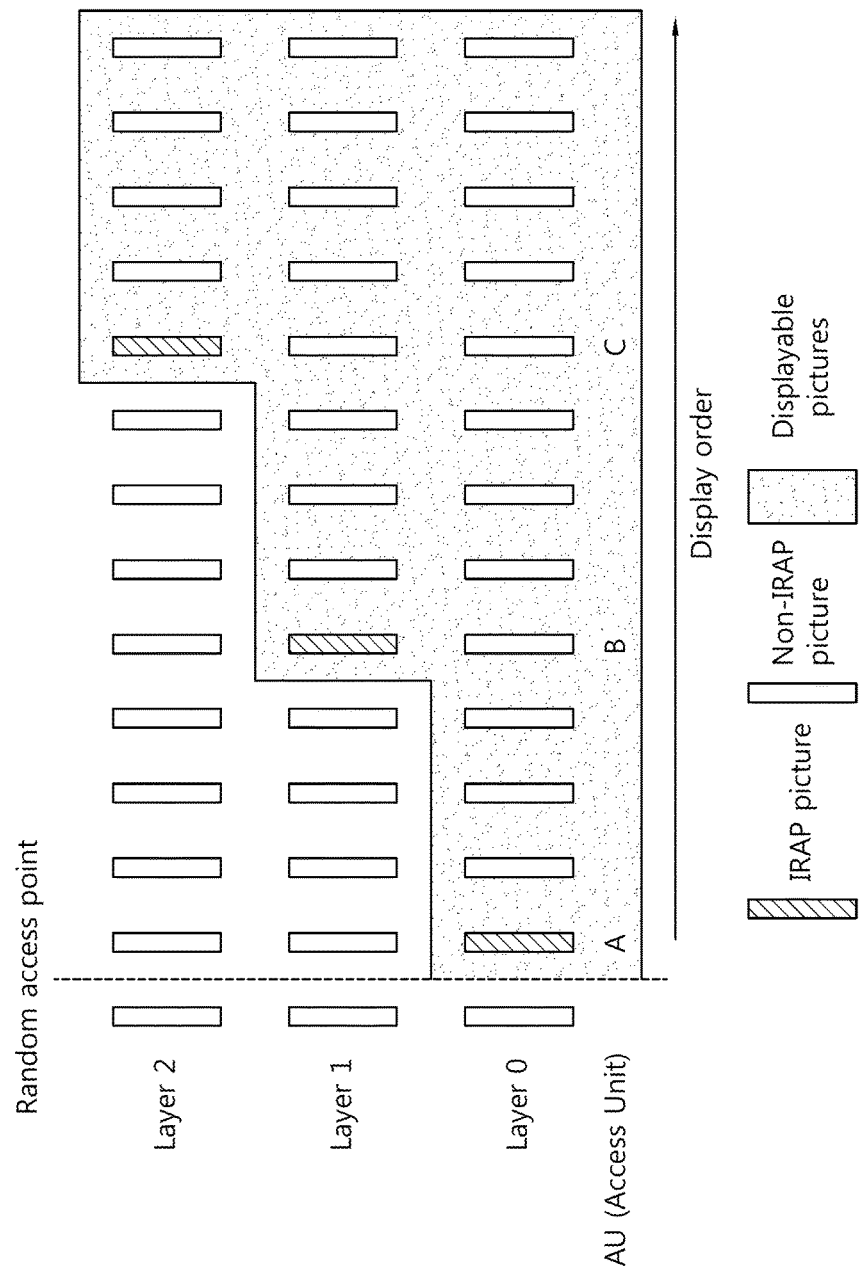
FIG. 4 illustrates a method of layer-wise startup decoding a bitstream according to the present invention.

FIG. 4 illustrates a method of layer-wise startup decoding a bitstream according to the present invention.

As shown in FIG. 4, there are three layers (layer 0, layer 1 and layer 2), each of which may include an IRAP picture and a non-IRAP picture.

Among pictures in AU A, a picture in a first layer (layer 0) is an IRAP picture, while pictures in a second layer (layer 1) and a third layer (layer 2) are non-IRAP pictures. Meanwhile, among pictures in AU B, a picture in the second layer (layer 2) is an IRAP picture, while pictures in the first layer (layer 0) and the third layer (layer 2) are non-IRAP pictures. Among pictures in AU C, a picture of the third layer (layer 2) is an IRAP picture, while pictures of the first layer (layer 0) and the second layer (layer 1) are non-IRAP pictures.

In the present invention, a bitstream may be encoded/decoded such that pictures are displayed gradually from a correctly decoded lower layer to a highest layer to finally display as displayed in FIG. 4.

FIGS. 5 to 8 illustrate a bitstream structure including a random access point according to embodiments of the present invention.

Figure 5:
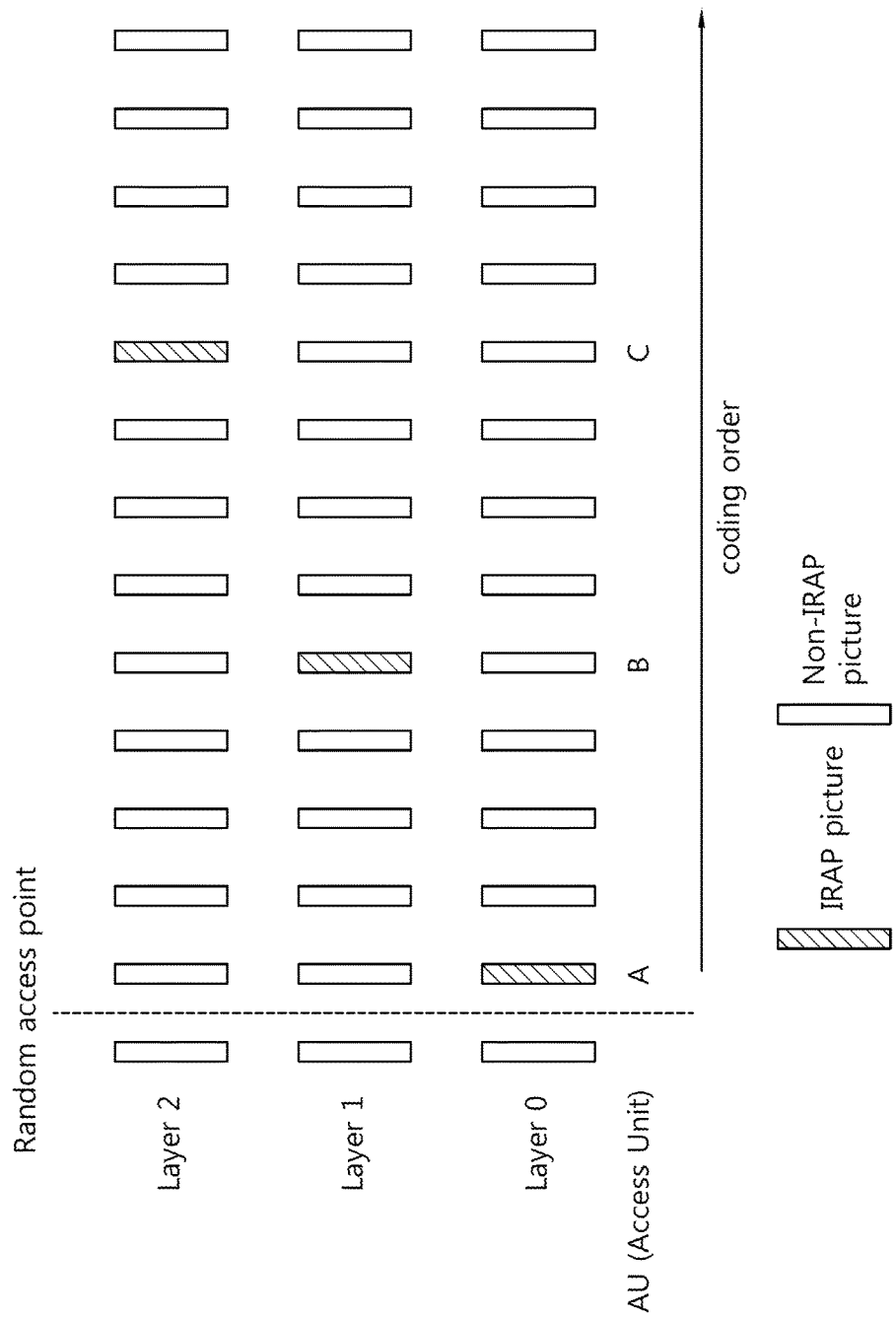
FIG. 5 illustrates a bitstream structure including a random access point according to an embodiment of the present invention.

In FIG. 5, as in FIG. 4, each AU includes a single IRAP picture, wherein lowest to higher layers temporally sequentially include IRAP pictures. In a bitstream of FIG. 5, a first layer (layer 0) may be decoded from AU A, a first layer (layer 0) and a second layer (layer 1) may be decoded from AU B, and all layers (layer 0, layer 1 and layer 2) may be decoded from AU C.

Figure 6:
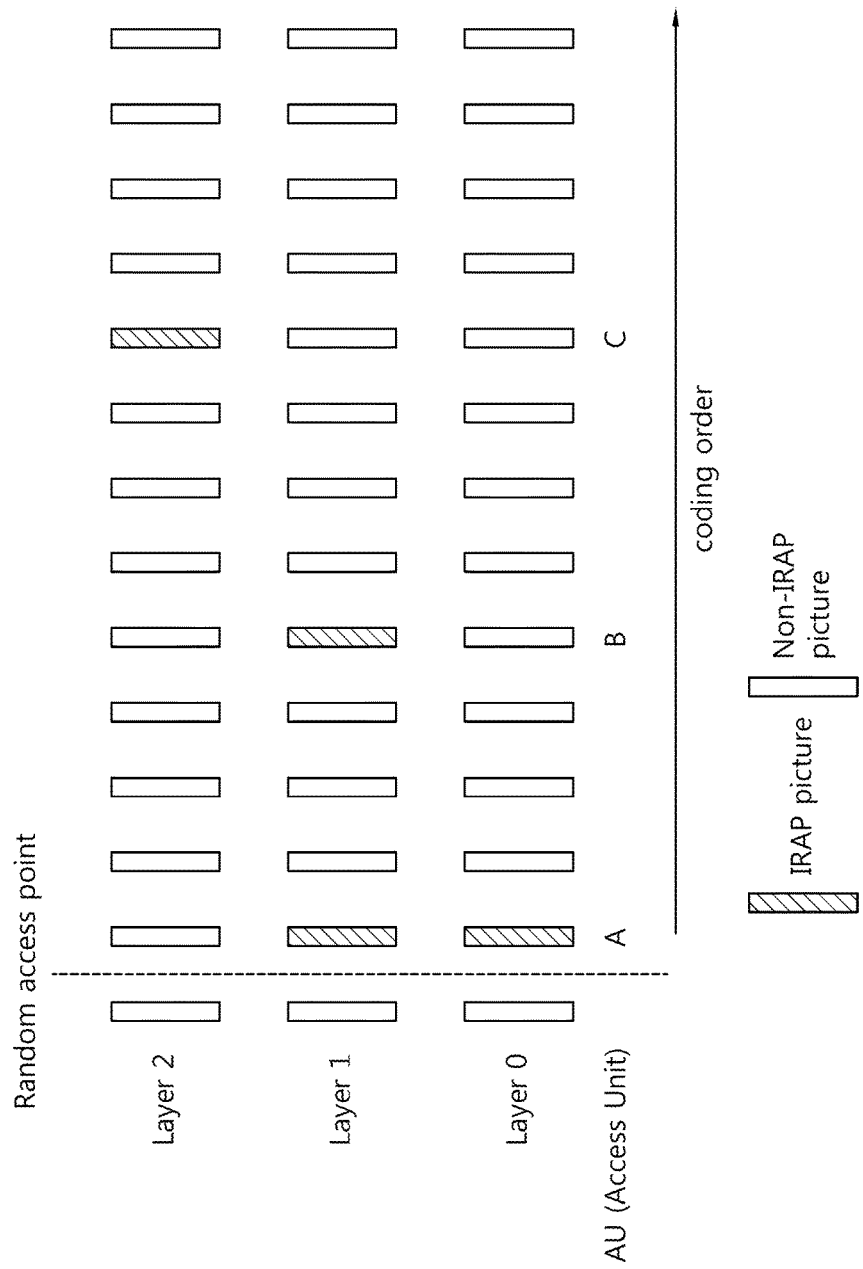
FIG. 6 illustrates a bitstream structure including a random access point according to another embodiment of the present invention.

In FIG. 6, pictures in a first layer (layer 0) and a second layer (layer 1) are IRAP pictures among pictures included in AU A, and only a picture of the second layer (layer 1) is an IRAP picture in AU B.

In a bitstream of FIG. 6, the first layer (layer 0) and the second layer (layer 1) may be decoded from AU A, and from the first to third layers, that is, all layers (layer 0, layer 1 and layer 3) may be decoded from AU C.

Figure 7:
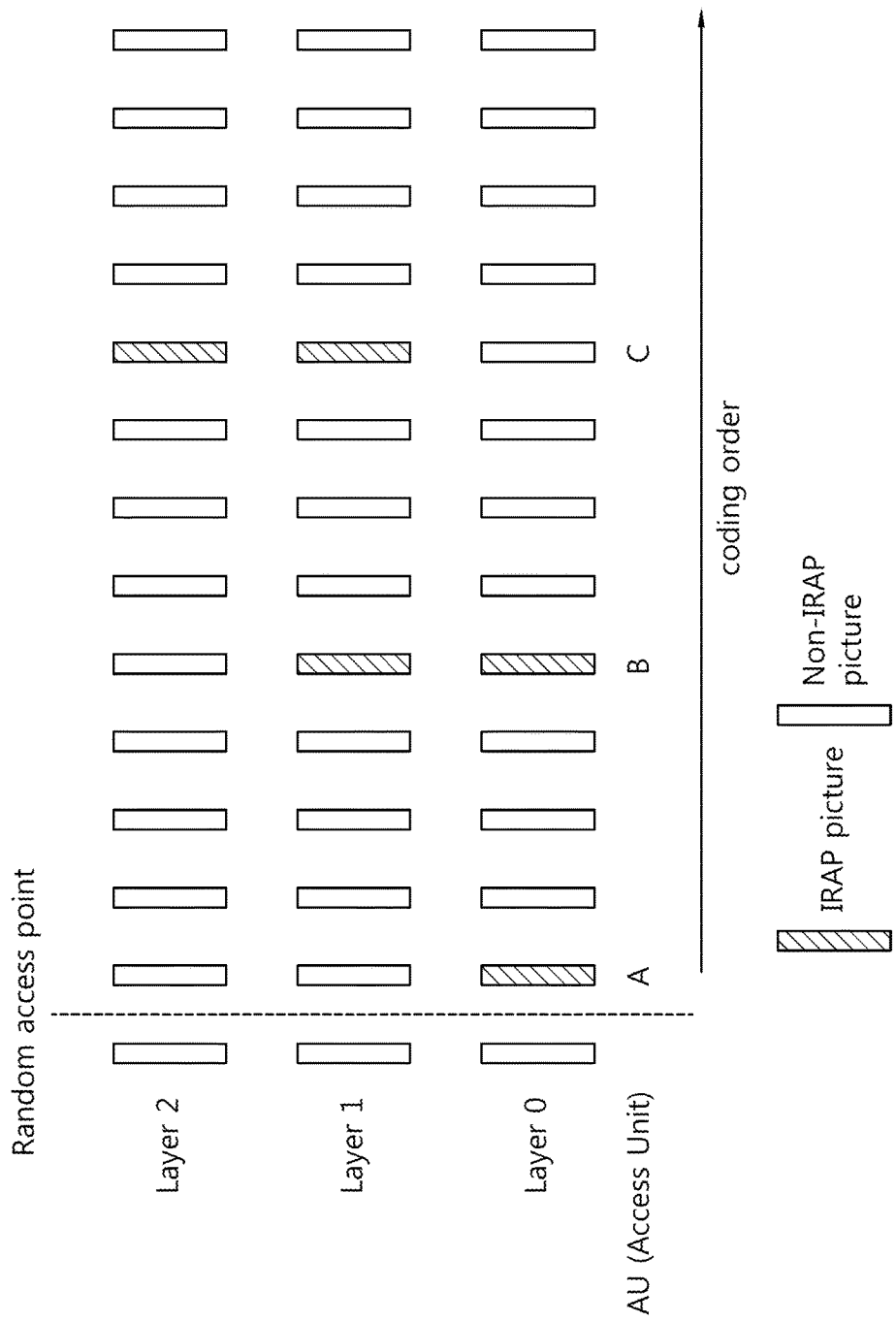
FIG. 7 illustrates a bitstream structure including a random access point according to still another embodiment of the present invention.

In FIG. 7, among pictures included in AU A, a picture in a first layer (layer 0) is an IRAP picture and pictures in a second layer (layer 1) and a third layer (layer 2) are non-IRAP pictures. Among pictures included in AU B, pictures in the first layer (layer 0) and the second layer (layer 1) are IRAP pictures, and among pictures included in AU C, pictures in the second layer (layer 1) and the third layer (layer 2) are IRAP pictures.

In FIG. 7, as in FIG. 5, the first layer (layer 0) may be decoded from AU A, the first layer (layer 0) and the second layer (layer 1) may be decoded from AU B, and all layers (layer 0, layer 1 and layer 2) may be decoded from AU C.

Figure 8:
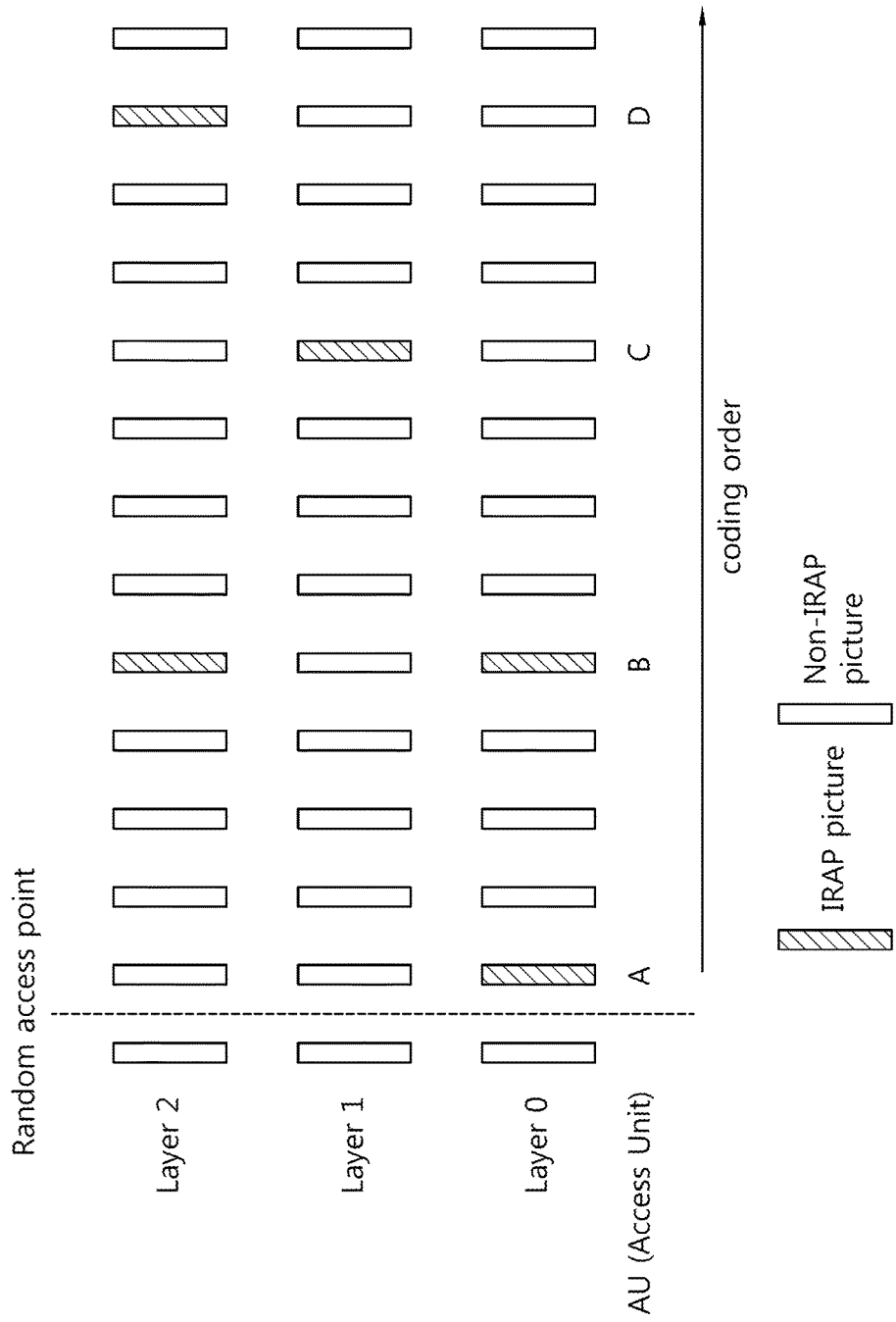
FIG. 8 illustrates a bitstream structure including a random access point according to yet another embodiment of the present invention.

In FIG. 8, among pictures included in AU A, only a picture in a first layer (layer 0) is an IRAP picture and pictures in a second layer (layer 1) and a third layer (layer 2) are non-IRAP pictures. Among pictures included in AU B, pictures in the first layer (layer 0) and the third layer (layer 2) are IRAP pictures, and among pictures included in AU C, only a picture in the second layer (layer 1) is an IRAP picture. In AU D, only a picture in the third layer (layer 2) is an IRAP picture.

In FIG. 8, the first layer (layer 0) may be decoded from AU A, and in AU B, the picture in the second layer (layer 1) is not an IRAP picture but a non-IRAP picture and thus is not decoded. In this case, pictures in the third layer (layer 2) which refer to the second layer (layer 1) may not be output normally. Thus, the first layer (layer 0) and the second layer (layer 1) may be decoded from AU C, then, all layers (layer 0, layer 1 and layer 2) may be decoded from AU D including an IRAP picture in the second layer (layer 1).

The present invention provides an encoding and decoding method which enables random access from AU A in the bitstreams with the structures of FIGS. 5 to 8. However, the encoding and decoding method according to the present invention is not restrictively applied to the bitstream structures of FIGS. 5 to 8.

In decoding a bitstream from a random access point, when an AU having a base layer that is an IRAP picture and having a higher layer is a first AU in the bitstream, a process of encoding/decoding the bitstream from the AU is illustrated as follows.

A method of decoding a bitstream from a random access point according to the present invention may be also applied to a case where a bitstream is input and decoded up to an nth layer and then layers start to be input up to an (n+k)th layer (here, k>0), that is, layer-switching.

When layer-wise startup is initiated from a random access point, a bitstream may have such a structure that an nth layer has a shorter IRAP picture period than an (n+1)th layer (0<=n<=62).

Figure 9:
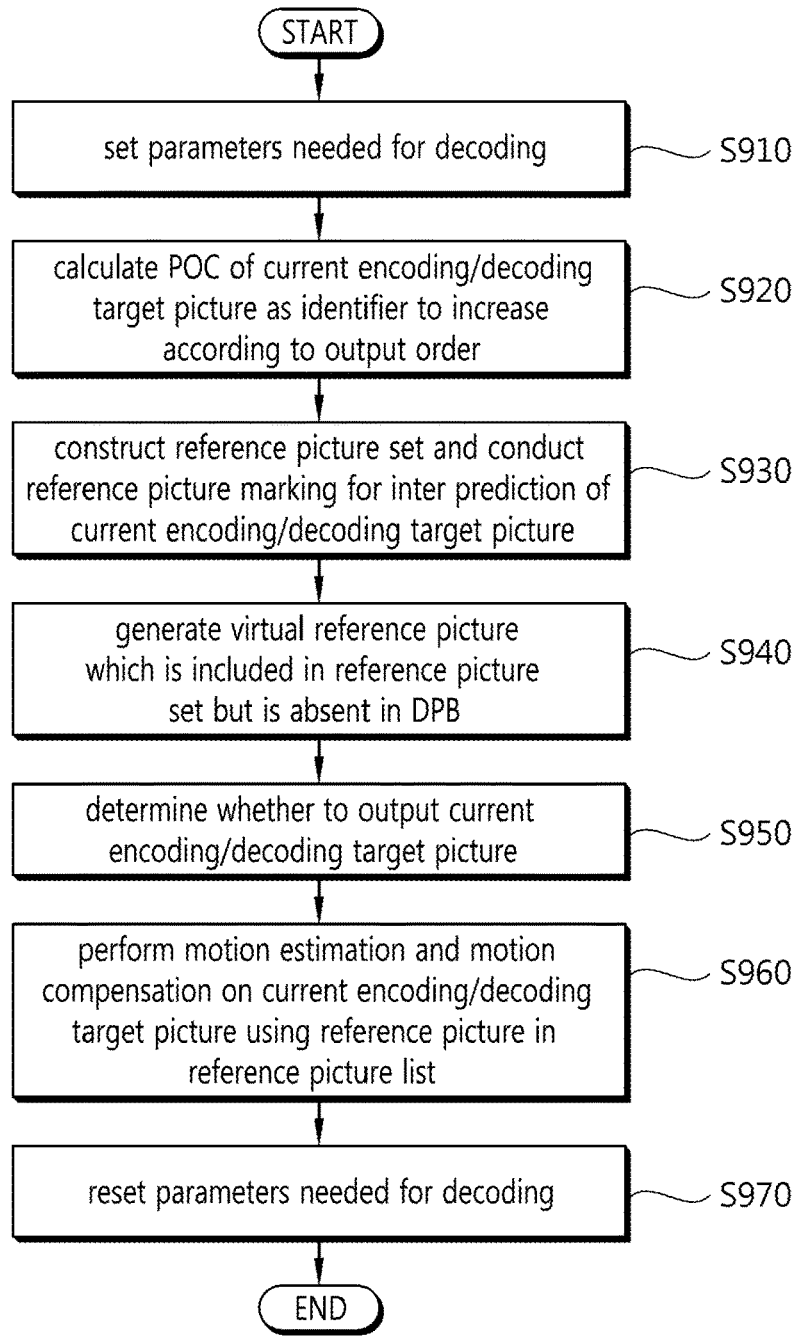
FIG. 9 is a flowchart illustrating a video decoding method according to an embodiment of the present invention.

FIG. 9 is a flowchart illustrating a video decoding method according to an embodiment of the present invention. Details mentioned with reference to FIG. 9 may be applied to not only the video decoding method but also a video encoding method.

First, the video decoding apparatus may set parameters needed for decoding (S910).

When a bitstream is decoded from a random access point, the parameters needed for decoding may be initialized or reset according to the following process. An order of (4) and (5) do not change. In detail, initialization process (5) is conducted after (3) and (4), and may be performed only when NoRaslOutputFlag is 1 in (3) or (4).

(1) When a base layer included in an AU at a random access point is an IRAP picture, that is, an instantaneous decoding refresh (IDR) picture, a broken link access (BLA) picture or a clean random access (CRA) picture, a flag indicating that all pictures included in the AU at the random access point are a first picture of each layer included in the bitstream, for example, FirstPicInLayerDecodedFlag, may be initialized as follows.

When a current encoding/decoding target picture is an IRAP picture which is included in the base layer (nuh_layer_id=0) in the AU at the random access point, flags of all possible higher layers, FirstPicInLayerDecodedFlag, may be initialized to 0.

That is, when a maximum number of possible higher layers is, for example, 63, that is, nuh_layer_id=63, FirstPicInLayerDecodedFlag[i], where 0<i<=63, may be set to 0.

(2) When the bitstream in which the base layer included in the AU at the random access point is the IRAP picture (that is, IDR picture, BLA picture or CRA picture) is decoded from the random access point, an initialization flag (for example, referred to as LayerInitialisedFlag) indicating that the corresponding layer among layers included in the bitstream is an IRAP picture and all reference layers of the layer are normally initialized so that a decoded picture of the layer is used as an output of the decoding apparatus may be set as follows. That is, the initialization flag indicates whether the decoding target picture is correctly decoded and output.

When a current encoding/decoding target picture is an IRAP picture and included in the base layer (nuh_layer_id=0) included in the AU at the random access point, LayerInitialisedFlag[0] is set to 1. LayerInitialisedFlag[i] of the other layers (1<=i<=63) is set to 0.

The initialization flag may be set to either 0 or 1 for each individual layer when decoding the bitstream starts, and then be reset depending on a flag variable and whether a reference layer referenced by a corresponding layer is correctly decoded, which will be mentioned below.

(3) When a current encoding/decoding target picture is an IDR picture, a BLA picture or an IRAP picture (including a CRA), which is a first picture of a layer (having the same nuh_layer_id as a layer of the current encoding/decoding target picture) in the bitstream, NoRaslOutputFlag may be set to 1. NoRaslOutputFlag is a flag variable indicating whether the IRAP picture is used as a random access point.

(4) When a current encoding/decoding target picture included in an AU decoded after the random access point in decoding order is an IRAP picture (IDR, BLA or CRA picture), nuh_layer_id=n, LayerInitialisedFlag[n] is 0, and all lower reference layers of a layer including the current encoding/decoding target picture are normally initialized (that is, LayerInitialisedFlag[RefLayerId[n][j]]=1, where RefLayerId[n][j] is nuh_layer_id of a jth reference layer of the current encoding/decoding target picture in an nth higher layer (nuh_layer_id=n)), NoRaslOutputFlag may be set to 1.

That is, when the decoding target picture is an IRAP picture, an initialization flag of a layer including the decoding target picture is set to 0, and an initialization flag of all reference layers of the layer including the decoding target picture is 1, a flag variable is set to 1.

(5) When a current encoding/decoding target picture is an IRAP picture in an nth higher layer (nuh_layer_id=n), not a picture of a base layer (nuh_layer_id=0), has NoRaslOutputFlag equal to 1, and has LayerInitialisedFlag[n] equal to 0, if all lower reference layers of a layer including the current encoding/decoding target picture are normally initialized (that is, LayerInitialisedFlag[RefLayerId[n][j]] is 1, where RefLayerId[n][j] refers to nuh_layer_id of a jth reference layer of the current encoding/decoding target picture in the nth higher layer (nuh_layer_id=n)), LayerInitialisedFlag[n] may be set to 1.

That is, when the decoding target picture is an IRAP picture, a flag variable is 1, an initialization flag of the decoding target picture is set to 0, and an initialization flag of all reference layers of the layer including the decoding target picture is 1, the initialization flag of the target layer is reset to 1 from 0.

The decoding apparatus calculates an identifier, Picture Order Count (POC), of the current encoding/decoding target picture, a POC value increasing according to output order (S920).

A POC is an identifier to identify pictures of a layer having the same nuh_layer_id in a coded video stream, and a later picture output from a decoded picture buffer (DPB) has an increasing POC. That is, a POC is a display order of a picture output from the DPB and displayed, and an IDR picture may have a POC of 0.

All pictures in the same AU may have the same POC.

When the same AU does not include an IRAP picture and a non-IRAP picture together, or includes only IRAP pictures which have the same NAL unit type, a POC may be calculated by a general method as follows.

A POC includes POC_most significant bit (MSB) and POC_least significant bit (LSB), and an overall POC may be a sum of an MSB and an LSB (POC=POC_MSB+POC_LSB). Here, a POC_LSB value is signaled via a slice header of a picture, and a maximum LSB, MaxPOCLSB, may be signaled via a sequence parameter set.

POC_MSB of a non-IRAP picture may be calculated using POC_MSB ("prevPOCMSB") and POC_LSB ("prevPOCLSB") of a picture close to the current picture among pictures having temporal_id of 0 and POC_LSB of the current encoding/decoding target picture, temporal_id representing an identifier of a temporal sub-layer previously encoded/decoded.

POC of an IDR picture may be always assumed to be 0. POC_MSB of a CRA picture being a first picture of the bitstream or of a BLA picture is assumed to be 0, and POC_LSB thereof may be signaled via a slice header. When a CRA picture is not the first picture of the bitstream, a POC may be calculated in the same manner as the non-IRAP picture.

When the same AU includes an IRAP picture and a non-IRAP picture together or includes only IRAP pictures which have two or more different NAL unit types, the pictures may have the same POC. To this end, flag information, such as poc_reset_flag, may be signaled via a slice header. The decoding apparatus may set POCs of all pictures in the AU including the slice to 0 when poc_reset_flag is 1. Here, the decoding apparatus may calculate an original POC value (POC 1) of the current encoding/decoding target picture by a general method, decrease POCs of reference layers of the layer including the picture present in the DPB by POC 1, and set the POC of the current target picture to 0.

Hereinafter, calculating a POC of a picture will be described in detail with reference to the following two cases.

First Case

When the bitstream including previously encoded AUs is decoded with an AU not being cut, that is, not being used as a random access point, pictures included in the AU may be decoded by the following process.

(a) An initial POC of the current encoding/decoding target picture may be set as follows.

When the picture is an IDR picture, the POC may be set to 0.

When the picture is a BLA picture or a CRA picture that is a first picture of a corresponding layer of the bitstream, POC_MSB is 0 and the POC may be set to POC_LSB signaled via a slice header.

When the picture is a CRA picture or a non-IRAP picture, the POC (POC 1) may be set by the general POC setting method using POC_LSB signaled via the slice header (as mentioned above, using POC_MSB (prevPOCMSB) and POC_LSB (prevPOCLSB) of a picture close to the current picture among previously encoded/decoded pictures with temporal_id of 0 and POC_LSB of the current encoding/decoding target picture).

(b) When pictures including a slice with poc_reset_flag equal to 1 are present in the DPB, POCs of all pictures in the DPB may be reduced by POC1.

(c) A POC of a picture including a slice with poc_reset_flag equal to 1 may be set to 0.

Second Case

When an AU is cut and used as a random access point, that is, when the AU is decoded as a first AU of the bitstream, for example, when a picture in the base layer (layer 0) is an IRAP picture which is a first picture of the encoded bitstream or a BLA picture, pictures included in the AU may be decoded by the following process.

(a) An initial POC of the current encoding/decoding target picture may be set as follows.

When the picture is an IDR picture, the POC may be set to 0.

When the picture is a BLA picture or a CRA picture that is a first picture of a corresponding layer of the bitstream, POC_MSB is 0 and the POC may be set to POC_LSB signaled via a slice header.

When the picture is a non-IRAP picture (for example, the current layer has nuh_layer_id=i and FirstPicInLayerDecodedFlag[i]=0), the POC (POC1) may be set by one of the following methods.

(a-1) The POC (POC1) may be set by the aforementioned general POC setting method using POC_LSB signaled via the slice header. Here, as the current AU is used as a random access point, there are no previously encoded/decoded pictures with temporal_id equal to 0, and thus both prevPOC-MSB and prevPOCLSB may be set to 0.

(a-2) When a BLA or CRA picture is present in a base layer of the same AU, POC_MSB of the current decoding target picture may be set to 0. In this case, the POC (POC1) of the current decoding target picture is set to POC_LSB signaled via the slice header of the current picture.

(a-3) The POC of the current decoding target picture may not be calculated.

(a-4) When an IDR picture is present in the base layer of the same AU, the POC of the current decoding target picture may be set to 0, without being calculated.

(b) After the POC of the current decoding target picture is calculated, when pictures including a slice with poc_reset_flag equal to 1 are present in the DPB, POCs of all pictures in the DPB may be reduced by POC1.

(c) A POC of a picture including a slice with poc_reset_flag equal to 1 may be set to 0.

Next, the video decoding apparatus constructs a reference picture set and conducts reference picture marking for inter prediction of the current encoding/decoding target picture (S930).

When poc_reset_flag initializing a POC is 0, POCs or POC_LSBs of slice reference pictures of the picture may be calculated as follows.

(1) POCs of short-term reference pictures (STRPs) are calculated using delta_POC representing each STRP signaled via a corresponding slice header and the POC of the current picture, POC1.

Here, delta_POC may be a POC difference between the current picture and an ith STRP or a POC difference between an (i+1)th STRP and an ith STRP.

(2) POC_LSBs or POCs of long-term reference pictures (LTRPs) are calculated using POC_LSB of each LTRP, delta_poc_msb_cycle_lt for calculating POC_MSB, and POC1 as the POC of the current picture. delta_poc_msb_cycle_lt may be signaled via a corresponding slice header.

For an LTRP, only POC_LSB is basically signaled and a POC of the LTRP is identified just by signaled POC_LSB. Here, when there is a reference picture having the same POC_LSB as that of a corresponding LTRP among a plurality of reference pictures, delta_poc_msb_cycle_lt for calculating POC_MSB is additionally signaled, thereby identifying a POC of each reference picture.

Meanwhile, when poc_reset_flag is 1, POCs or POC_LSBs of slice reference pictures of the picture may be calculated as follows.

(1) POCs of STRPs are calculated using delta_POC representing each STRP signaled via a corresponding slice header and the POC of the current picture equal to 0.

Here, delta_POC may be a POC difference between the current picture and an ith STRP or a POC difference between an (i+1)th STRP and an ith STRP.

(2) POC_LSBs or POCs of LTRPs are calculated using POC_LSB of each LTRP, delta_poc_msb_cycle_lt for calculating POC_MSB, the POC of the current picture equal to 0, and POC_LSB signaled via a slice header of the current picture. delta_poc_msb_cycle_lt may be signaled via a slice header of a corresponding LTRP.

For an LTRP, only POC_LSB is basically signaled and a POC of the LTRP is identified just by signaled POC_LSB. Here, when there is a reference picture having the same POC_LSB as that of a corresponding LTRP among a plurality of reference pictures, delta_poc_msb_cycle_lt for calculating POC_MSB is additionally signaled, thereby identifying a POC of each reference picture.

As such, when poc_reset_flag is 1, POCs or POC_LABs of reference pictures signaled via a slice header of the picture including the slice with poc_reset_flag equal to 1 may be adjusted using POC1 of the current picture to correspond to the reduced POCs of the pictures in the DPB.

When the POCs of the reference pictures are calculated, a reference picture set is constructed and a type of a reference picture may be marked depending on whether the reference picture is present in the DPB.

The video decoding apparatus may generate a virtual reference picture which is included in the reference picture set but is absent in the DPB (S940).

When nuh_layer_id=0, the current encoding/decoding target picture is an IRAP picture and NoRaslOutputFlag=1 or when nuh_layer_id>0 (when the current encoding/decoding target picture is an IRAP picture with FirstPicInLayerDecodedFlag[nuh_layer_id]=1 and NoRaslOutputFlag=1 or when FirstPicInLayerDecodedFlag[nuh_layer_id]=0), pictures absent in the DPB among pictures included in the reference picture set for the current encoding/decoding target picture (constructed in S930) may be virtually generated and stored in the DPB.

The generated virtual pictures have the same POCs as those of the reference pictures calculated in S920. PicOutputFlag indicating whether a virtual reference picture is output from the DPB is set to 0, at which the virtual reference picture is not output.

The generated virtual reference pictures may be marked as either an STRP or an LTRP as signaled in the reference picture set. In detail, the virtual reference pictures may be marked as an STRP which is referenced by the current picture and precedes the current picture in display order, an STRP which is referenced by the current picture and follows the current picture in display order, an LTRP referenced by the current picture, an STRP referenced by subsequent pictures to the current picture, or an LTRP referenced by subsequent pictures to the current picture.

Next, the video decoding apparatus may determine whether to output the current encoding/decoding target picture (S950). PicOutputFlag indicating whether to output a decoded picture may be set as follows. When PicOutputFlag is 1, the picture is sent from the DPB as an output of the decoding apparatus. When PicOutputFlag is 0, the picture may not be sent from the DPB as an output of the decoding apparatus.

(1) When the current picture is a random access skipped leading (RASL) picture and NoRaslOutputFlag of an IRAP picture closest to the current picture among previously encoded/decoded IRAP pictures to the current picture is 1, PicOutputFlag may be set to 0.

Here, an RASL picture is a leading picture following the IRAP picture closest to the current picture among the previously encoded/decoded IRAP pictures to the current picture in encoding/decoding order but preceding the IRAP picture in display order, and is encoded/decoded using an encoded/decoded picture prior to the IRAP picture as a reference picture.

(2) When condition (1) is not satisfied, the picture has nuh_layer_id equal to n and LayerInitialisedFlag[n]=0, PicOutputFlag may be set to 0.

(3) When conditions (1) and (2) are not satisfied, PicOutputFlag may be set by one of the following methods.

a. PicOutputFlag may be set to pic_output_flag signaled via a slice header.

b. PicOutputFlag may be set to pic_output_flag signaled via a slice header when the corresponding layer is an output layer, while PicOutputFlag may be set to 0 when the corresponding layer is not an output layer.

c. When the corresponding layer is not an output layer, a higher layer right above the layer is an IRAP picture, and LayerInitialisedFlag of all lower reference layers of the higher layer is 1, PicOutputFlag may be set to 0.

d. When the corresponding layer is not an output layer, a higher layer right above the layer is an IRAP picture, a lower reference layer having LayerInitialisedFlag equal to 0 is present among lower reference layers of the higher layer, and an output layer is present among higher layers of the layer, PicOutputFlag of the layer may be set to pic_output_flag signaled via a slice header. Here, if there is a layer with PicOutputFlag equal to 1 which is not an output layer among lower layers close to the layer, PicOutputFlag of the layer may be set to 0.

e. When the corresponding layer is not an output layer, a picture corresponding to an output layer is absent in the same AU, the layer is a direct reference picture of an output layer picture (a picture of the layer directly referenced by the corresponding layer) or an indirect reference picture (a layer needing a layer directly referenced by the corresponding layer for encoding/decoding), the picture is a direct or indirect reference picture of the output layer picture and is a highest picture (that is, a picture with greatest nuh_layer_id) among decoded pictures with pic_output_flag equal to 1 signaled via a slice header, PicOutputFlag of the picture may be set to 1. Otherwise, PicOutputFlag may be set to 0.

f. When the corresponding layer is not an output layer, a picture corresponding to an output layer is absent in the same AU, the layer is a direct reference picture of an output layer picture (a picture of the layer directly referenced by the corresponding layer) or an indirect reference picture (a layer needing a layer directly referenced by the corresponding layer for encoding/decoding), and the picture is a direct or indirect reference picture of the output layer picture which has LayerInitializedFlag equal to 1 and is a highest picture (that is, a picture having greatest nuh_layer_id) among decoded pictures with pic_output_flag equal to 1 signaled via a slice header, PicOutputFlag of the picture may be set to 1. Otherwise, PicOutputFlag may be set to 0.

In c, d, e and f, the decoding apparatus may control output of pictures in the DPB to achieve the same results as those from setting PicOutputFlag.

When it is determined whether to output a picture, the video decoding apparatus performs motion estimation and motion compensation on the current encoding/decoding target picture using reference pictures in a reference picture list (S960).

Here, motion estimation and motion compensation may be performed on the current encoding/decoding target picture using reference pictures in the reference picture list by a general inter prediction method.

After inter prediction is performed using reference pictures, the parameters needed for decoding may be reset (S970). The video decoding apparatus may set FirstPicInLayerDecodedFlag[i] of the layer including the current encoding/decoding target picture, for example, a layer with nuh_layer_id=i, to 1 when FirstPicInLayerDecodedFlag[i] is 0.

The decoding apparatus may conduct the decoding method from S910 to S970 by layers. When a decoding process for a first AU is finished, pictures with PicOutputFlag equal to 1 among layers in the first AU may be output.

For instance, when pictures in base to nth layers are IRAP pictures, if output layers to originally output are included in the base to nth layers (0<=n), decoded pictures in the output layer are output. If the output layers are included in (n+1)th to highest layers, a decoded picture in the nth layer may be output.

Subsequently, when an AU including an IRAP picture from (n+1)th to kth layers is decoded in a process of decoding subsequent AUs, if output layers to originally output among decoded pictures in from 0th to kth layers are included in base to kth layers, decoded pictures in the output layer are output. If the output layers are included in (k+1)th to highest layers, a decoded picture in the kth layer or a picture with PicOutputFlag equal to 1 may be output.

The decoding apparatus may repeat the foregoing process on an AU until a picture in the highest layer is decoded, thereby decoding the bitstream.

Figure 10:
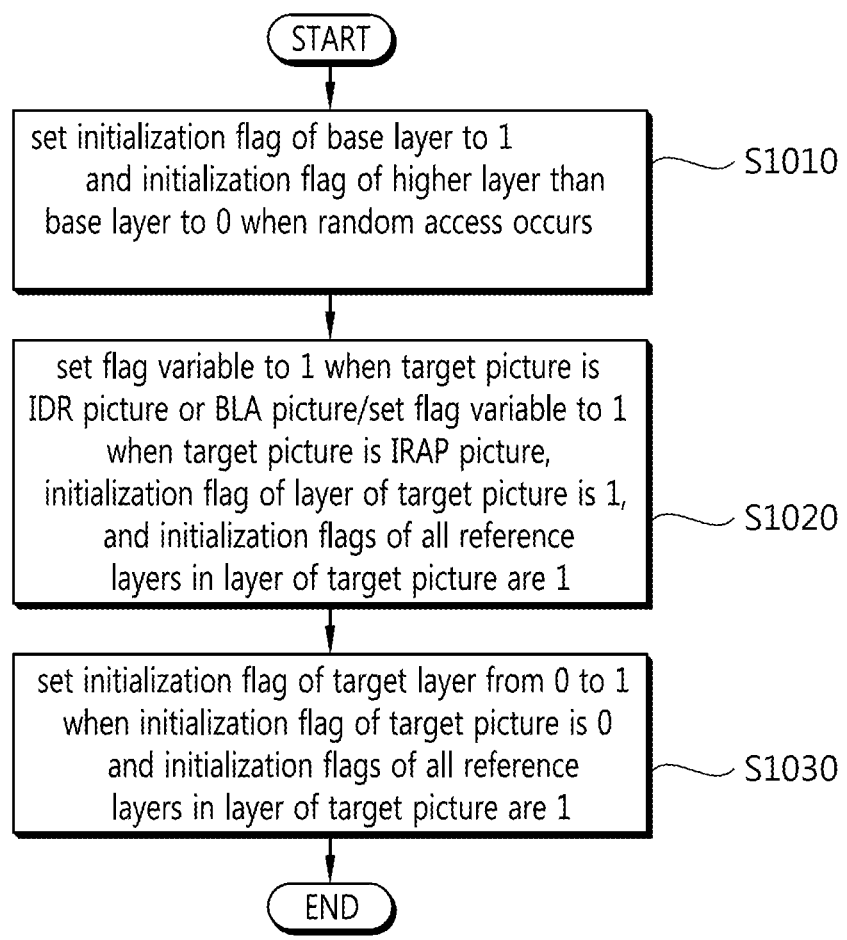
FIG. 10 illustrates a method of setting decoding parameters according to an embodiment of the present invention.

FIG. 10 illustrates a method of setting decoding parameters according to an embodiment of the present invention.

When the first random access occurs in a bitstream, the decoding apparatus may set an initialization flag of a base layer to 1 and an initialization flag of a higher layer than the base layer to 0 (S1010).

An initialization flag (LayerInitialisedFlag) indicates whether a layer among layers included in a bitstream is an IRAP picture and all reference layers of the layer are normally initialized so that a decoded picture in the layer is available as an output from the decoding apparatus when the bitstream in which the base layer included in an AU at a random access point is an IRAP picture (that is, IDR picture, BLA picture or CRA picture) is decoded at the random access point. That the reference layers are normally initialized may mean that the picture is correctly decoded and may output from the decoding apparatus.

The decoding apparatus may set an initialization flag indicating whether a decoded picture in a layer is available as an output from the decoding apparatus before decoding the bitstream. When a current encoding/decoding target picture is an IRAP picture which is in the base layer (nuh_layer_id=0) included in the AU at the random access point, the decoding apparatus may set LayerInitialisedFlag [0] to 1, and set LayerInitialisedFlag[i] of other layers (1<=i<=63) to 0.

After the initialization flags are set, the decoding apparatus may set a flag variable (NoRaslOutputFlag) indicating whether a picture is used as a random access point.

The decoding apparatus may set the flag variable to 1 when the target picture is an IDR picture or BLA picture, or an IRAP picture which is a first picture of a layer (having the same nuh_layer_id as the layer of the current encoding/decoding target picture) in the bitstream. The decoding apparatus may set the flag variable to 1 when the target picture is an IRAP picture, an initialization flag of the layer of the target picture is 0, and initialization flags of all reference layers in the layer of the target picture are 1 (S1020).

When the target picture is an IRAP picture and the flag variable of the target picture is determined to be 1, the decoding apparatus may determine whether the initialization flag of the target picture is 0 and the initialization flags of all reference layers in the layer of the target picture are 1. When it is determined that the initialization flag of the target picture is 0 and the initialization flags of all reference layers in the layer of the target picture are 1, the decoding apparatus may set the initialization flag of the target layer from 0 to 1 (S1030).

That is, when a condition for the layer of the target picture to be correctly decoded is satisfied, the initialization flag, which is set to 0 in S1010, may be changed to 1.

When the initialization flag is set, the target picture is decoded as in the method of FIG. 9, and accordingly pictures of higher layers may be gradually output depending on whether decoded pictures are output.

Figure 11:
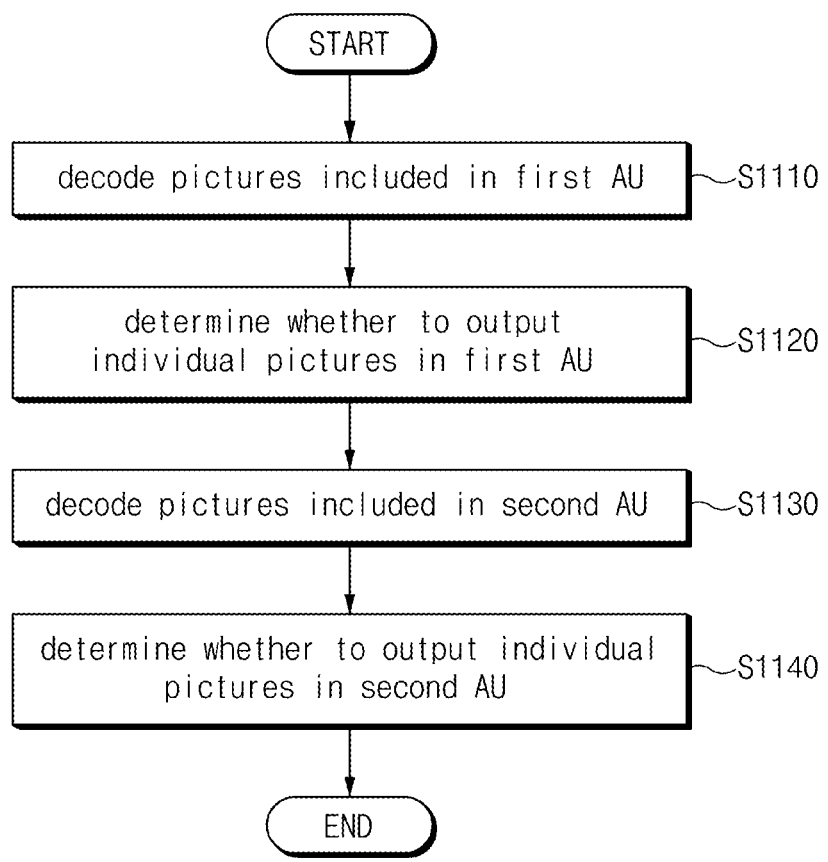
FIG. 11 is a flowchart illustrating a method of decoding an inter-layer video according to an embodiment of the present invention.

FIG. 11 is a flowchart illustrating a method of decoding an inter-layer video according to an embodiment of the present invention. FIG. 11 illustrates a method of decoding pictures by each AU and applying such decoding to a plurality of layers to finally decode a bitstream.

When random access occurs, the decoding apparatus sets parameters for decoding as in S910 of FIG. 9 and FIG. 10 and decodes pictures included in a first AU (S1110). A process of decoding the pictures may correspond to S910 to S970 of FIG. 9, and thus description thereof is omitted herein to avoid redundancy.

When the pictures in the first AU is finished, the decoding apparatus may determine whether to output the individual pictures in the first AU (S1120).

In determining whether to output the individual pictures, the decoding apparatus may determine not to output a decoding target picture when an initialization flag of a target layer including the decoding target picture is 0.

Also, the decoding apparatus may determine to output the target picture when the target layer including the decoding target picture is not an output layer, no output target picture included in the output layer is present in an AU including the target layer, that is, the output target picture is determined not to be output, the target layer is used for the output layer for reference so that the target picture is used as a reference picture of the output picture, and the target picture is a highest picture among decoded pictures with flag information equal to 1, the flag information being signaled via a slice header and representing whether to output a picture.

Further, the decoding apparatus may determine to output the target picture when the target layer including the decoding target picture is not an output layer, no output target picture included in the output layer is present in an AU including the target layer, that is, the output target picture is determined not to be output, the target layer is used for the output layer for reference so that the target picture is used as a reference picture of the output picture, the target layer has an initialization flag of 1, and the target picture is a highest picture among decoded pictures with flag information equal to 1, the flag information being signaled via a slice header and representing whether to output a picture.

When a process of determining output of the first AU is finished, the decoding apparatus may decode pictures included in a next AU, that is, a second AU (S1130) and determine whether to output the individual pictures (S1140).

A method of determining whether to output the pictures in the second AU may be the same as used for the first AU.

The decoding apparatus may output a picture determined to be output corresponding to an output time of each picture.

As described above, when random access occurs, the decoding apparatus determines whether to output pictures in an AU individually to output outputable pictures and subsequently determines whether to output pictures in a next AU, thereby outputting pictures in layers possible to correctly decode and output. Accordingly, pictures of higher layers may be gradually decoded and output.

According to the present invention, there are provided a method of decoding a bitstream from a random access point when an AU at the random access point includes an IRAP picture and a non-IRAP picture, or includes only IRAP pictures which have two or more different NAL unit types, and an apparatus using the same.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The foregoing embodiments include various aspects of examples. Although all possible combinations to illustrate various aspects may not described herein, it will be understood by those skilled in the art that various combinations may be made therein without departing from the spirit and scope of the invention as defined by the appended claims. Therefore, all differences, changes and modifications within the scope will be construed as being included in the present invention.

The invention claimed is:

1. A method of decoding a bitstream comprising a plurality of layers, the method comprising:
   setting parameters for decoding the bitstream from a random access point when random access occurs; and
   decoding a decoding target picture,
   wherein the setting of the parameters comprises
   setting an initialization flag indicating whether the decoding target picture is correctly decoded and output when the random access occurs;
   setting a flag variable (NoRaslOutputFlag) indicating whether the decoding target picture is used as a random access point; and
   resetting an initialization flag of a target layer to 1 when the decoding target picture is an intra random access point (IRAP) picture, the flag variable is 1, the initialization flag of the decoding target picture is 0 and initialization flags of all reference layers of the target layer are 1.

2. The method of claim 1, wherein the setting of the initialization flag sets the initialization flag for a base layer of an access unit (AU) at which the random access occurs to 1 and sets the initialization flag for a higher layer than the base layer to 0.

3. The method of claim 2, wherein the setting of the flag variable (NoRaslOutputFlag) sets the flag variable to 1 when the decoding target picture is an instantaneous decoding refresh (IDR) picture, a broken link access (BLA) picture or an intra random access point (IRAP) picture which is a first picture of the target layer of the bitstream.

4. The method of claim 2, wherein the setting of the flag variable (NoRaslOutputFlag) sets the flag variable to 1 when the target picture is an IRAP picture, the initialization flag of the target layer including the target picture is 0, and the initialization flags of all reference layers of the target layer including the target picture are 1.

5. The method of claim 1, further comprising
calculating a picture order count (POC) of the decoding target picture as an identifier;
constructing a reference picture set and marking a reference picture type for inter prediction of the decoding target picture;
determining whether to output the decoding target picture based on the initialization flag; and
performing motion estimation and motion compensation on the decoding target picture using a reference picture in a reference picture list generated based on the reference picture set.

6. The method of claim 5, wherein the determining of whether to output the decoding target picture determines not to output the decoding target picture when the decoding target picture is an IRAP picture and the initialization flag of the target layer is 0.

7. The method of claim 5, wherein the determining of whether to output the decoding target picture determines to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, and the decoding target picture is a highest picture among decoded pictures with flag information equal to 1, the flag information being signaled via a slice header and representing whether to output a picture.

8. The method of claim 5, wherein the determining of whether to output the decoding target picture determines to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, the initialization flag of the target layer is 1, and the decoding target picture is a highest picture among decoded pictures with flag information equal to 1, the flag information being signaled via a slice header and representing whether to output a picture.

9. The method of claim 5, wherein the calculating of the POC sets the POC of the decoding target picture to 0 when a picture of a base layer in the same AU is an IDR picture, and sets a most significant bit (MSB) of the decoding target picture to 0 when the picture of the base layer is a BLA picture or a first CRA picture of the bitstream.

10. The method of claim 1, further comprising
decoding pictures comprised in a first AU corresponding to the random access point;
determining whether to output the individual pictures in the first AU;
decoding pictures comprised in a second AU following the first AU; and
determining whether to output the individual pictures in the second AU.

11. The method of claim 10, further comprising
determining outputting a first AU picture which outputs a picture determined to be output among the pictures in the first AU,
wherein the outputting of the first AU picture outputs an output picture of an output layer when the bitstream comprises a base layer to a highest layer, all pictures from the base layer to an nth layer ($0 \leq n$) are IRAP pictures, and the base layer to the nth layer comprise the output layer, and outputs a decoded picture in the nth layer when an (n+1)th layer to the highest layer comprise the output layer.

12. The method of claim 11, further comprising
determining outputting a second AU picture which outputs a picture determined to be output among the pictures in the second AU,
wherein the outputting of the second AU picture outputs an output picture of an output layer when the (n+1)th layer to a kth layer ($n+1 \leq k$) comprised in the second AU comprise an IRAP picture and the base layer to the kth layer comprise the output layer, and outputs a decoded picture in the kth layer or the picture determined to be output when a (k+1) layer to the highest layer comprises the output layer.

13. An apparatus for decoding a bitstream comprising a plurality of layers, the apparatus comprising:
a prediction module to set parameters for decoding the bitstream from a random access point when random access occurs and to decode a decoding target picture,
wherein the prediction module sets an initialization flag indicating whether the decoding target picture is correctly decoded and output when the random access occurs, sets a flag variable (NoRaslOutputFlag) indicating whether the decoding target picture is used as a random access point, and resets an initialization flag of a target layer to 1 when the decoding target picture is an intra random access point (IRAP) picture, the flag variable is 1, the initialization flag of the decoding target picture is 0 and initialization flags of all reference layers of the target layer are 1.

14. The apparatus of claim 13, wherein the prediction module sets an initialization flag for a base layer of an access unit (AU) at which the random access occurs to 1 and sets an initialization flag for a higher layer than the base layer to 0.

15. The apparatus of claim 14, wherein the prediction module sets the flag variable to 1 when the decoding target picture is an instantaneous decoding refresh (IDR) picture, a broken link access (BLA) picture or an intra random access point (IRAP) picture which is a first picture of the target layer of the bitstream.

16. The apparatus of claim 14, wherein the prediction module sets the flag variable to 1 when the target picture is an IRAP picture, the initialization flag of the target layer including the target picture is 0, and the initialization flags of all reference layers of the target layer including the target picture are 1.

17. The apparatus of claim 13, wherein the prediction module calculates a picture order count (POC) of the decoding target picture as an identifier, constructs a reference picture set and marks a reference picture type for inter prediction of the decoding target picture, determines whether to output the decoding target picture based on the initialization flag, and performs motion estimation and motion compensation on the decoding target picture using a reference picture in a reference picture list generated based on the reference picture set.

18. The apparatus of claim 17, wherein the prediction module determines not to output the decoding target picture when the decoding target picture is an IRAP picture and the initialization flag of the target layer is 0.

19. The apparatus of claim 17, wherein the prediction module determines to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, and the decoding target picture is a highest picture among decoded pictures with flag information equal to 1, the flag information being signaled via a slice header and representing whether to output a picture.

20. The apparatus of claim 17, wherein the prediction module determines to output the decoding target picture when the target layer is not an output layer as an output target, an output target picture belonging to the output layer in an AU which the target layer belongs to is determined not to be output, the target layer is used for the output layer for reference so that the decoding target picture is used as a reference picture of the output target picture, the initialization flag of the target layer is 1, and the decoding target picture is a highest picture among decoded pictures with flag information equal to 1, the flag information being signaled via a slice header and representing whether to output a picture.

* * * * *